(12) United States Patent
Kaminski et al.

(10) Patent No.: US 7,214,094 B2
(45) Date of Patent: May 8, 2007

(54) TWIST MOUNT WIRING RECEIVER

(75) Inventors: Gary Kaminski, Emporia, KS (US); Lawrence Guerra, Shawnee, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 497 days.

(21) Appl. No.: 10/810,972

(22) Filed: Mar. 26, 2004

(65) Prior Publication Data

US 2005/0212360 A1 Sep. 29, 2005

(51) Int. Cl.
*H01R 13/73* (2006.01)

(52) U.S. Cl. ............... 439/550; 439/316; 439/462; 439/559

(58) Field of Classification Search .............. 439/35, 439/142, 144, 274, 275, 314, 316, 462, 550, 439/551, 527, 559
See application file for complete search history.

(56) References Cited

U.S. PATENT DOCUMENTS

| | | | | |
|---|---|---|---|---|
| 3,790,698 A | * | 2/1974 | Engert | ............ 174/152 R |
| 4,390,226 A | * | 6/1983 | Hohn | ............ 439/261 |
| 4,429,938 A | * | 2/1984 | Flor | ............ 439/314 |
| 4,940,424 A | * | 7/1990 | Odbert | ............ 439/369 |
| 5,344,333 A | | 9/1994 | Haag | |
| 6,143,933 A | | 11/2000 | Scheinmann et al. | |
| 6,203,349 B1 | * | 3/2001 | Nakazawa | ............ 439/319 |
| 6,358,076 B1 | | 3/2002 | Haag | |
| 6,364,681 B1 | * | 4/2002 | Watanabe | ............ 439/335 |
| 6,447,302 B1 | | 9/2002 | Davis | |
| 6,582,248 B2 | * | 6/2003 | Bachman | ............ 439/462 |
| 6,634,897 B2 | | 10/2003 | Cykon et al. | |
| 6,824,423 B1 | * | 11/2004 | Fahl | ............ 439/544 |

* cited by examiner

*Primary Examiner*—Thanh-Tam Le
(74) *Attorney, Agent, or Firm*—Hovey Williams, LLP

(57) ABSTRACT

A wiring receiver (10) that may be mounted on a towing vehicle without the use of tools. The receiver (10) broadly comprises a plurality of terminals (22) for transferring signals from the towing vehicle to a towed vehicle, a main body (20) housing the terminals (22), and a cover (24) that mates to the main body (20), thereby securing the receiver (10) to a bracket (12) of the towing vehicle. The main body (20) includes a contact surface (30) with four protrusions (34) extending through the bracket 12. The cover (24) includes a contact surface (44) having arcuate slots (54) operable to slide around the protrusions (34), thereby securing the main body (20) to the towing vehicle.

7 Claims, 2 Drawing Sheets

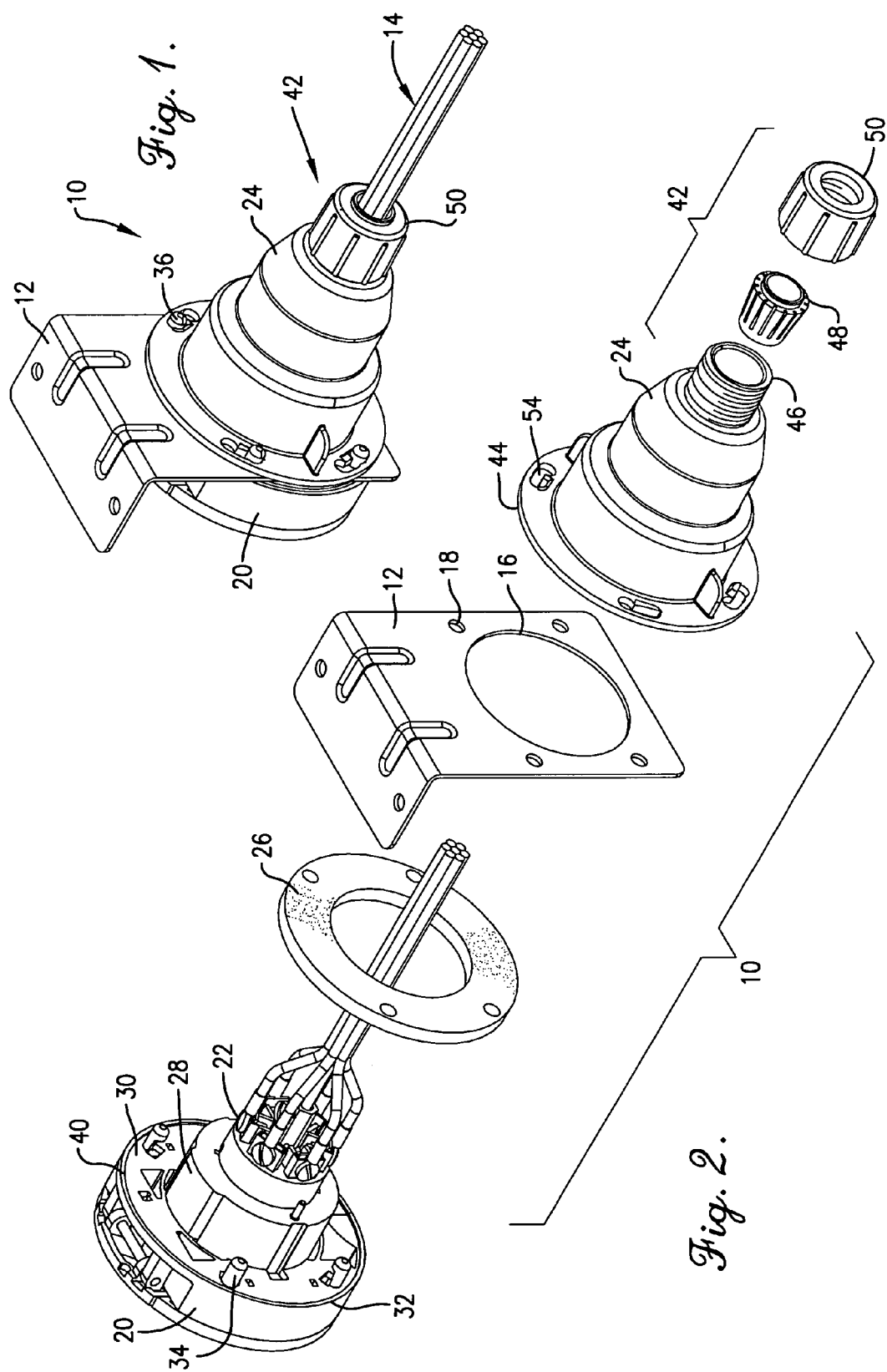

TWIST MOUNT WIRING RECEIVER

BACKGROUND OF THE INVENTION

1. Field of the Invention

The present invention relates to wiring receivers. More particularly, the present invention relates to a wiring receiver that may be physically secured to a traditional bracket without the use of tools, by merely twisting a portion of the receiver.

2. Description of Prior Art

Wiring receivers are commonly used to connect wiring of towed vehicles with wiring of towing vehicles. For example, it is common to use a wiring receiver to connect the wiring of a truck to the wiring of a trailer so that the lights and turn signals of the trailer are synchronized with the truck's lights and turn signals. However, traditional receivers are complicated to install. Furthermore, traditional connectors must typically be installed using tools and multiple fasteners. Such installation is often troublesome and inconvenient.

In response, receivers that may be installed without the use of tools have been designed. However, recent receivers may only be installed onto special and/or customized brackets. Since these brackets themselves must be installed onto vehicles using tools and multiple fasteners, such advances do not effectively address the problem.

Furthermore, traditional brackets are already installed on many vehicles. In these cases, the traditional brackets must first be removed, before the customized brackets may be installed, further complicating installation.

Accordingly, there is a need for an improved wiring connector that overcomes the limitations of the prior art.

SUMMARY OF THE INVENTION

The present invention overcomes the above-identified problems and provides a distinct advance in the art of wiring receivers. More particularly, the present invention provides a wiring receiver that may be physically secured to a traditional bracket without the use of tools, by merely twisting a portion of the receiver. The bracket is preferably mounted on a towing vehicle. The receiver electrically couples the towing vehicle's wiring to a towed vehicle's wiring. The receiver broadly comprises a main body housing a plurality of terminals that carry electrical signals from the towing vehicle to the towed vehicle and a cover for holding the main body to the bracket and protecting the terminals. The main body includes a substantially cylindrical receptacle to receive a plug from the towed vehicle and a contact surface juxtaposed to the bracket. The cylindrical receptacle is preferably designed to fit through a mounting hole of the bracket.

The contact surface generally extends radially from the cylindrical receptacle and includes at least two protrusions spaced in such a manner that each protrusion may slide into a different securement hole of the bracket. Each protrusion includes a substantially circular end and a substantially semi-circular stem. Both the end and the stem have a radius substantially matching that of the securement holes. Thus, as the cylindrical receptacle is slid into the mounting hole, the protrusions are likewise slid into the securement holes. In this manner, the receiver is prevented from rotating about the bracket.

The cover is preferably substantially conical and includes a cable seal and a contact surface opposite the cable seal. The cable seal preferably includes a cylindrical portion having exterior threads, a resilient conical grommet sized to fit snugly into the cylindrical portion, and an interiorly threaded end-cap for holding the grommet in place.

The contact surface of the cover is preferably circular and defines at least two arcuate slots with each slot having an enlarged opening in one end. The openings are preferably the same size as, or slightly larger than, the ends of the protrusions and the remainder of each slot is preferably substantially narrower than the ends. Thus, with the main body is placed into the bracket and the protrusions extending through the bracket, the cover may be slid over the cylindrical receptacle with the protrusions penetrating the openings of the slots. Then, the cover may be twisted slightly, thereby sliding the stems along the slots and securing the receiver to the bracket. Since the ends of the protrusions are larger than the remainder of the slots, the bracket is firmly sandwiched between the contact surfaces of the main body and the cover. In this manner, the receiver is rigidly mounted to the bracket and the towing vehicle.

In order to lock the receiver in this configuration, the slots may include slightly raised portions. The ends of the protrusions are forced over the raised portions, and are thereby prevented from sliding back. Alternatively, or in addition to the raised portions, the slots may include projections that extend into the slots. In this case, the stems of the protrusions would be forced past the projections, and would thereby be prevented from sliding back.

The receiver may also include one or more resilient gaskets adjacent the bracket. For example, a gasket may be placed between the main body and the bracket. Alternatively, or in addition, a gasket may be placed between the cover and the bracket. In either case, the gasket may push the main body, the cover, or both away from the bracket slightly. Thus, the gasket maintains pressure on the projections in the slots, such that the cover does not rotate about the main body, thereby keeping the receiver secured to the bracket. In addition, the gasket may act to seal the receiver to the bracket.

In use, a user preferably slides a cable from the towing vehicle through the end-cap, the grommet, and the cylindrical portion of the cover. The user then slides the cable through the mounting hole of the bracket and the gasket. The user then electrically connects the cable to the terminals of the main body. The user then slides the cylindrical receptacle and the protrusions of the main body through the gasket and into the bracket. With the main body mounted to the bracket, the user may slide the cover onto the protrusions of the main body and twist the cover slightly, thereby securing the receiver onto the bracket. Finally, the user preferably slides the grommet into the cylindrical portion and tightens the end-cap onto the cylindrical portion, thereby sealing the receiver to the cable. In this manner, the receiver may be rigidly secured to the bracket of the towing vehicle without the use of tools.

BRIEF DESCRIPTION OF THE DRAWINGS

A preferred embodiment of the present invention is described in detail below with reference to the attached drawing figures, wherein:

FIG. 1 is a perspective view of a wiring receiver constructed in accordance with a preferred embodiment of the present invention and shown mounted to a bracket which in turn may be mounted to a vehicle;

FIG. 2 is an exploded perspective view of the receiver;

DETAILED DESCRIPTION OF A PREFERRED EMBODIMENT

Figure 3:
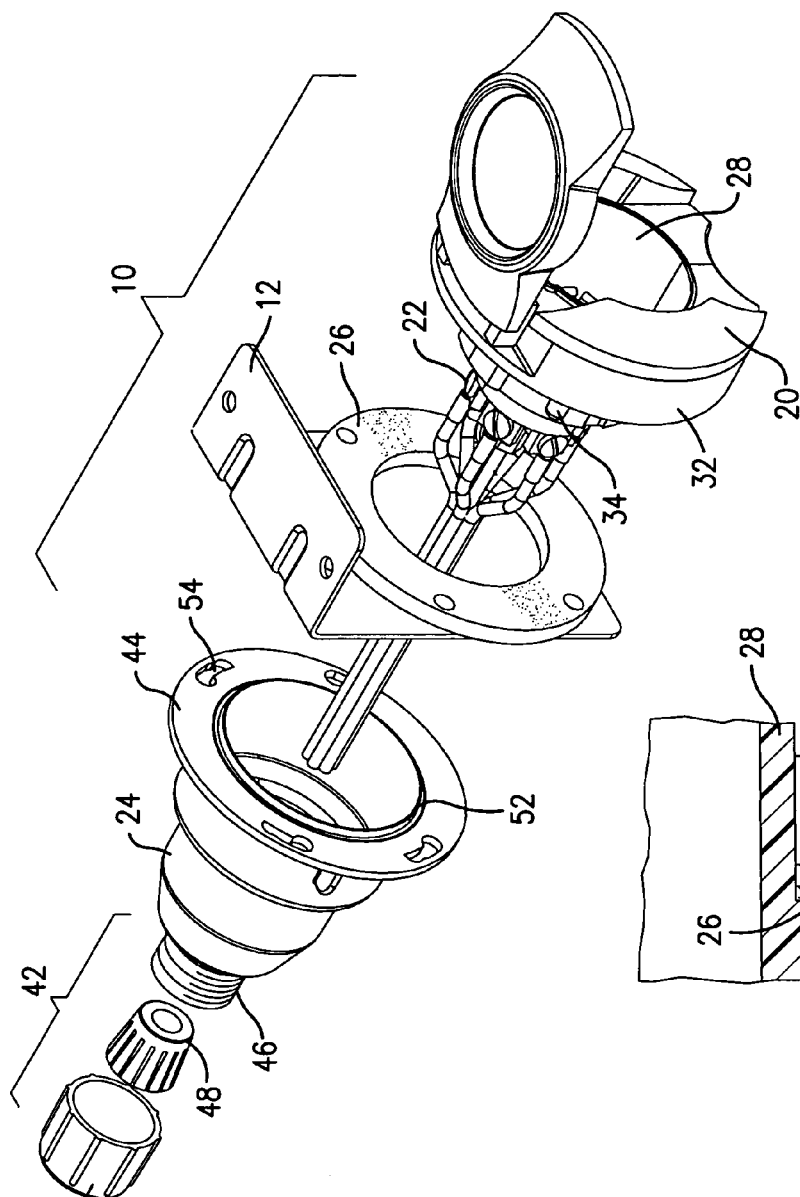
FIG. 3 is another exploded perspective view of the receiver.
Figure 5:
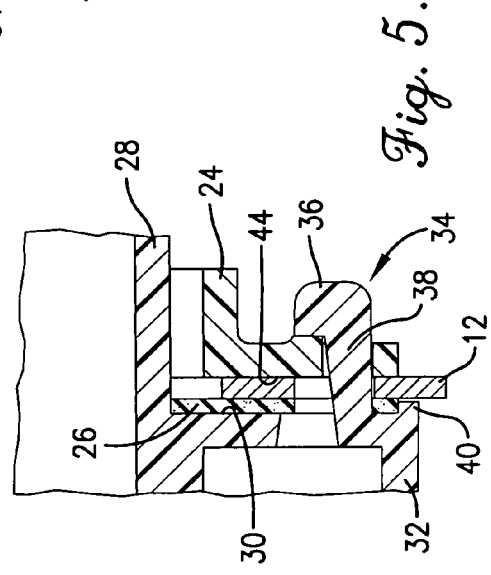
FIG. 5 is a cross-sectional view of a portion of the receiver, taken along line 5—5 of FIG. 4.

Referring to FIG. 1, a preferred wiring receiver 10 constructed in accordance with a preferred embodiment of the present invention is illustrated and shown mounted to a traditional bracket 12 that is preferably secured to a towing vehicle. The towing vehicle typically provides electrical signals and/or power to a towed vehicle. The receiver 10 is preferably electrically coupled with the towing vehicle's wiring and may receive a plug which is electrically coupled with the towed vehicle's wiring. In this manner, the receiver 10 electrically couples the wiring of the towing vehicle to the wiring of the towed vehicle.

For example, the wiring of the towed vehicle may include electric brakes and/or other components that require electrical signals and/or auxiliary electrical power from the towing vehicle. The electric brakes aid the towing vehicle is slowing the towed vehicle and may also illuminate stop lights to indicate when the towed vehicle is slowing down and/or stopping. Therefore, the wiring of the towing vehicle preferably includes the signals and/or auxiliary power and preferably electrically couples with the receiver 10 through a cable 14. Thus, the wiring of the towing vehicle is preferably operable to electrically communicate the signals to the towed vehicle through the cable 14, the receiver 10, and the plug.

Referring also to FIG. 2, the bracket 12 is preferably substantially conventional and of the type currently used to mount conventional receivers thereto. The receiver 10 of the present invention may be attached or connected to virtually any towing vehicle using the bracket 12. The bracket 12 preferably includes an approximately two and one eighth inch diameter mounting hole 16 for accepting the receiver 10 and at least two approximately three sixteenths of an inch diameter securement holes 18 for securing the receiver 10 to the bracket 12.

The plug, wiring, towing vehicle, and towed vehicle are likewise preferably completely conventional, but may be specialized. For example, the plug may be specially designed, such as that disclosed in a co-pending application entitled "TOWING CONNECTOR" Ser. No. 10/213,886 filed Aug. 8, 2003, hereby incorporated into the present application by reference.

Referring also to FIG. 3, the receiver 10 broadly comprises a main body 20 housing seven terminals 22 that carry the signals, a cover 24 for holding the main body 20 to the bracket 12 and protecting the terminals 22, and at least one resilient gasket 26 between the main body 20 and the cover 24. The main body 20 includes a rear facing substantially cylindrical receptacle 28 to receive the plug from the towed vehicle and a forward facing contact surface 30. The cylindrical receptacle 28 preferably has an interior diameter sized to snugly receive the plug. The cylindrical receptacle 28 also includes an exterior diameter slightly smaller than the mounting hole 16 of the bracket 12, and therefore may fit through the mounting hole 16.

The contact surface 30 generally extends radially from the cylindrical receptacle 28 and preferably has an approximately three and one eighth inch outer diameter. As the contact surface 30 is responsible for securely holding the cylindrical receptacle 28 adjacent the bracket 12, the contact surface 30 is preferably rigid. Therefore, the contact surface 30 may be supported by a plurality of sidewalls. For example, the sidewalls may include an outer sidewall 32 substantially concentric with the cylindrical receptacle 28 and extending rearwardly from the contact surface's 30 outer diameter. In this manner, the contact surface 30 is supported in order to securely and rigidly hold the cylindrical receptacle 28 adjacent the bracket 12.

The contact surface 30 also includes at least two forwardly extending protrusions 34 spaced around the contact surface in such a manner that each protrusion 34 may slide into a different one of the securement holes 18 of the bracket 12. In the preferred embodiment, the contact surface 30 includes four protrusions 34. Each protrusion 34 includes a substantially circular end 36 and a substantially semi-circular stem 38. Both the end 36 and the stem 38 have a radius substantially matching that of the securement holes 18, or approximately three thirty-seconds of an inch. The end 36 is approximately one eighth of an inch long and the stem 38 is approximately one quarter inch long. Thus, as the cylindrical receptacle 28 is slid into the mounting hole 16, the protrusions 34 are likewise slid into the securement holes 18. In this manner, the receiver 10 is prevented from rotating about the bracket 12. The contact surface 30 may also include a ridge 40 along its perimeter, in order to aid in sealing the contact surface 30 to the bracket 12, as will be discussed in greater detail below.

The cover 24 is preferably substantially conical and includes a cable seal 42 and a rearward facing contact surface 44 opposite the cable seal 42. The cable seal 42 preferably includes a cylindrical portion 46 having exterior threads, a resilient conical grommet 48 sized to fit snugly into the cylindrical portion 46, and an interiorly threaded end-cap 50 for holding the grommet 48 in place. The cable 14 is preferably slid through the end-cap 50, the grommet 48, and the cylindrical portion 46 before being electrically connected to the terminals 22. The end-cap 50 may then be used to force the grommet 48 into the cylindrical portion 46, thereby sealing to the cable 14 and preventing water, dirt, or debris from entering the receiver 10.

The contact surface 44 of the cover 24 is preferably circular with an approximately two inch inner diameter and an approximately three inch outer diameter, thereby creating an approximately one half inch wide ring. The cover 24 may include a ridge 52 around the inner diameter to rigidly align the cover 24 with the mounting hole 16 of the bracket 12. The ridge 52 may also aid in sealing the cover 24 to the bracket 12, as will be discussed in further detail below.

Figure 4:
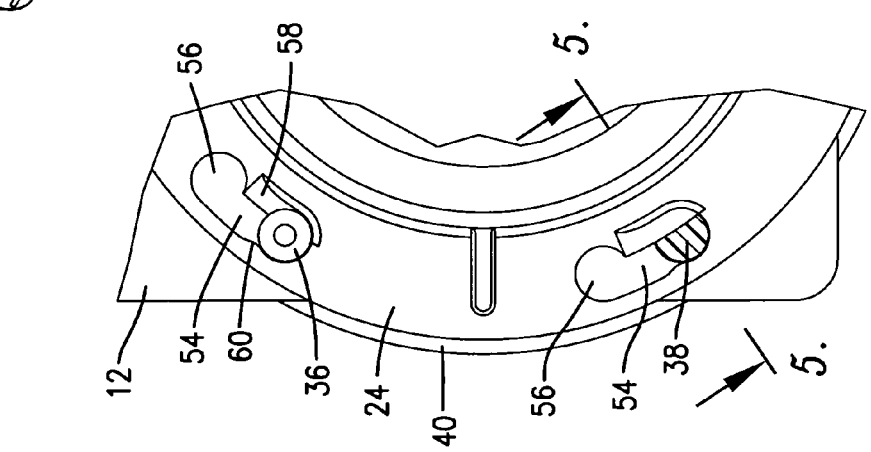
FIG. 4 is a fragmentary view of a portion of the receiver showing the interaction between protrusions and slots of the receiver.

Referring also to FIG. 4, the contact surface 44 of the cover 24 preferably defines at least two arcuate slots 54 with each slot 54 having an enlarged opening 56 in a clockwise end. In the preferred embodiment, the contact surface 44 includes four slots 54. The openings 56 are preferably the same size as, or slightly larger than, the ends 36 of the protrusions 34. Thus, the openings 56 are preferably approximately three sixteenths of an inch in diameter. Likewise, the remainder of each slot 54 is preferably substantially narrower than the ends 36 but sized to accept the stems 38, or approximately three thirty-seconds of an inch wide. Thus, with the main body 20 placed into the bracket 12 and the protrusions 34 extending through the bracket 12, the cover 24 may be slid over the cylindrical receptacle 28 with the protrusions 34 penetrating the openings 56 of the slots 54. Then, the cover 24 may be twisted slightly clockwise, thereby sliding the stems 38 along the slots 54 and securing the receiver 10 to the bracket 12. Since the ends 36 of the protrusions 34 are larger than the remainder of the slots 54, the bracket 12 is firmly sandwiched between the contact surfaces 30,44 of the main body 20 and the cover 24. In this manner, the receiver 10 is rigidly mounted to the bracket 12 and the towing vehicle.

In order to lock the receiver 10 in this configuration, the slots 54 may include slightly raised portions 58 substantially centered along the slots 54, or near the slots' 54 counterclockwise end. The ends 36 of the protrusions 34 are forced over the raised portions 58, and are thereby prevented from sliding back. Alternatively, or in addition to the raised portions 58, the slots 54 may include projections 60 that extend into the slots 54. In this case, the stems 38 of the protrusions 34 would be forced past the projections 60, and would thereby be prevented from sliding back.

The gasket 26 may be placed on either side of the bracket 12. For example, the gasket 26 is preferably placed between the main body 20 and the bracket 12. Alternatively, the gasket 26 may be placed between the cover 24 and the bracket 12. However, the receiver 10 include two gaskets 26, with one gasket 26 placed on each side of the bracket 12. The gasket 26 reduces wear and noise associated with the vibration of the towing and towed vehicles. The gasket 26 also pushes the main body 20, the cover 24, or both away from the bracket 12 thereby preventing the cover 24 from rotating with respect to the main body 20, and thereby keeping the receiver 10 mounted to the bracket 12. As such, the gasket 26 may be constructed from virtually any resilient material. However, the gasket 26 also preferably forms a seal between the bracket 12 and the main body 20, as well as between the bracket and the cover 24. In this regard, the gasket 26 is preferably constructed from a water-proof resilient material, such as rubber. In any case, the gasket 26 may be pinched by the ridges 40,52 thereby improving the seal therebetween. Similarly, the grommet 48 is preferably made of rubber in order to seal to the cable 14.

The terminals 22 are preferably constructed from brass, copper, or another suitably conductive material. The remainder of the receiver 10 is preferably constructed of molded plastic. Furthermore, in order to increase rigidity and integrity of the receiver 10, the cylindrical receptacle 28, contact surface 30, and sidewalls 32 of the main body 20 are preferably molded as a single unit.

While the present invention has been described above, it is understood that substitutions may be made. For example, while the majority of the receiver 10 is constructed of molded plastic, the receiver 10 may be made from other suitable materials, such as fiberglass, carbon fiber, or other composites. It is important that the receiver 10 be rigid and substantially water-proof. It is also desirable for the majority of the receiver 10, other than the terminals 22, to be non-conductive. Additionally, while terms such as rearward and forward have been used throughout this document, they are for reference purposes only. Such terms are most important for their relationship to each other. For example, the entire receiver 10 could be rotated approximately ninety degrees, such that rearward would equate to rightmost and forward would equate to leftmost, without departing from scope of the present invention. Similarly, the protrusions 34 may extend from the contact surface 44 of the cover 24 and into the slots 54, which may be associated with the contact surface 30 of the main body 20. In this case, the main body 20 may rotate within the cover 24. Furthermore, the cover 24 may be much more simplistic than that shown and described. For example, the cover 24 may essentially consist of only the contact surface 44, with its associated elements and functionality. In this case, the main body 20 itself preferably includes an ability to protect the terminals 22. Additionally, while the present invention has been described as having seven terminals 22, other numbers of terminals 22 may be used, depending upon a specific application. For example, the receiver 10 may include four, five, or six terminals 22. Furthermore, the terminals 22 of the present invention may or may not require the use of tools in order to electrically connect the cable 14 thereto. For example, the terminals 22 could be designed to mate with a plug terminated onto the cable 14. Finally, the receiver 10 may be configured to accommodate a flip-up door to cover the terminals 22, when not in use. These and other minor modifications are within the scope of the present invention.

In use, a user preferably slides the cable 14 through the end-cap 50, the grommet 48, and the cylindrical portion 46 of the cover 24. The user then preferably slides the cable 14 through the mounting hole 16 of the bracket 12 and the gasket 26. The user then preferably electrically connects the cable 14 to the terminals 22 of the main body 20. The user then slides the cylindrical receptacle 28 and the protrusions 34 of the main body 20 through the gasket 26 and into the bracket 12. With the main body 20 mounted to the bracket 12, the user may slide the cover 24 onto the protrusions 34 of the main body 20 and twist the cover slightly clockwise, thereby locking the receiver onto the bracket 12. Finally, the user preferably slides the grommet 48 into the cylindrical portion 46 and tightens the end-cap 50 onto the cylindrical portion 46, thereby sealing the cable 14 to the receiver 10. It can be seen that the receiver 10 may be rigidly secured to the bracket 12 of the towing vehicle without the use of tools.

Having thus described a preferred embodiment of the invention, what is claimed as new and desired to be protected by Letters Patent includes the following:

The invention claimed is:

1. A wiring receiver that may be mounted on a towing vehicle without the use of tools, the receiver comprising:
   a plurality of terminals for transferring a plurality of electrical signals from the towing vehicle to a towed vehicle;
   a main body substantially housing the terminals and having a first contact surface facing a first direction and a plurality of protrusions extending from the contact surface in the first direction, the protrusions being arranged to be inserted through a traditional mounting bracket of the towing vehicle; and
   a cover operable to engage the protrusions, rotate about at least a portion of the main body, and slide along the protrusions, thereby mounting the main body to the vehicle, wherein the cover includes
      a second contact surface having a plurality of slots therein and facing a second direction which is substantially opposite to the first direction, at least a portion of the bracket being sandwiched between the contact surfaces of the main body and the cover.

2. The receiver as set forth in claim 1, wherein the cover includes a cable seal operable to substantially seal to a cable of the towing vehicle.

3. The receiver as set forth in claim 2, wherein the cable seal includes a cylindrical portion having exterior threads, a resilient conical grommet sized to fit snugly into the cylindrical portion, and an interiorly threaded end-cap for holding the grommet in place.

4. The receiver as set forth in claim 1, wherein the slots are substantially arcuate.

5. The receiver as set forth in claim 1, wherein the slots each include an enlarged opening at one end.

6. A wiring receiver that may be mounted on a towing vehicle without the use of tools, the receiver comprising:
- a plurality of terminals for transferring a plurality of electrical signals from the towing vehicle to a towed vehicle;
- a main body arranged around the terminals and including
  - a forward facing contact surface,
  - a cylindrical receptacle substantially housing the terminals, and
  - a plurality of protrusions extending forwardly from the contact surface, the protrusions arranged to be inserted through a traditional mounting bracket of the towing vehicle;
- a substantially conical cover operable to mate with the main body and including
  - a rear facing contact surface having arcuate slots operable to slide around the protrusions, thereby mounting the main body to the vehicle, and
  - a cable seal operable to substantially seal to a cable of the towing vehicle; and
- a resilient gasket for placement between the main body and the bracket, at least a portion of the bracket being sandwiched between the contact surfaces of the main body and the cover.

7. The receiver as set forth in claim 6, wherein the slots each include an enlarged opening at one end.

* * * * *